United States Patent
Naquin et al.

(10) Patent No.: US 12,225,259 B2
(45) Date of Patent: Feb. 11, 2025

(54) SYNCHRONIZING CONTENT DISPLAY ACROSS MULTIPLE DEVICES

(71) Applicant: Infinite Athlete, Inc., San Francisco, CA (US)

(72) Inventors: Michael Naquin, Alamo, CA (US); Erik Schwartz, Los Altos Hills, CA (US); Charles D. Ebersol, Atlanta, GA (US); Anne Gerhart, Atlanta, GA (US)

(73) Assignee: Infinite Athlete, Inc., Covina, CA (US)

( * ) Notice: Subject to any disclaimer, the term of this patent is extended or adjusted under 35 U.S.C. 154(b) by 66 days.

(21) Appl. No.: 17/696,271

(22) Filed: Mar. 16, 2022

(65) Prior Publication Data

US 2023/0300400 A1    Sep. 21, 2023

(51) Int. Cl.
*H04N 21/43* (2011.01)
*H04N 21/214* (2011.01)
*H04N 21/414* (2011.01)

(52) U.S. Cl.
CPC ... *H04N 21/43076* (2020.08); *H04N 21/2143* (2013.01); *H04N 21/41407* (2013.01)

(58) Field of Classification Search
CPC ......... H04N 21/43076; H04N 21/2143; H04N 21/41407
See application file for complete search history.

(56) References Cited

U.S. PATENT DOCUMENTS

| | | | | |
|---|---|---|---|---|
| 10,158,927 B1 * | 12/2018 | Lei | ........................ | H04N 21/233 |
| 10,706,482 B1 | 7/2020 | McClements, IV | | |
| 2012/0200774 A1 * | 8/2012 | Ehlers, Sr. | ......... | H04N 21/4852 348/E9.034 |
| 2013/0234946 A1 * | 9/2013 | Moon | .............. | H04N 21/42204 345/156 |
| 2014/0053214 A1 * | 2/2014 | Walker | ................. | H04N 21/242 725/62 |
| 2014/0064693 A1 * | 3/2014 | Deshpande | ........ | H04N 21/4828 386/230 |
| 2015/0062429 A1 | 3/2015 | Barbulescu | | |
| 2018/0234936 A1 | 8/2018 | Crowe | | |
| 2019/0116395 A1 * | 4/2019 | Kerdranvat | .......... | H04N 21/439 |
| 2023/0274623 A1 * | 8/2023 | Beaudin | ............. | H04N 21/8547 381/56 |

* cited by examiner

*Primary Examiner* — Jefferey F Harold
*Assistant Examiner* — Alexander Boyd
(74) *Attorney, Agent, or Firm* — Van Pelt, Yi & James LLP

(57) ABSTRACT

Techniques are disclosed to synchronize content display across multiple devices, e.g., in a same physical location. In various embodiments, a content feed comprising a representation of an event is received. A content stream comprising or derived from the content feed and a synchronization signal that associates each of a plurality of portions of the content stream with a corresponding real-world time at the event depicted in the content stream are generated. The content stream and the synchronization signal are provided to a location via a communication interface. Each of a plurality of devices at the location is configured to use the synchronization signal to render the content stream in a manner that is synchronized with one or more other of the devices.

21 Claims, 7 Drawing Sheets

SYNCHRONIZING CONTENT DISPLAY ACROSS MULTIPLE DEVICES

BACKGROUND OF THE INVENTION

Many consumers enjoy watching in a group setting live or pre-recorded events, such as a professional or amateur sports contest, a music concert or other artistic performance, a Presidential debate or other significant civic or cultural events, and other live or pre-recorded broadcast events. Examples of a group setting include without limitation a sports bar, a gaming establishment, a public or private club, a private residence, or any other public or private place where people may gather.

In some group settings, viewers may consume the same content (e.g., a broadcast of a live or recorded event) in the same space but on different devices, potentially having different latency in receiving the content of the broadcast. For example, some viewers of a live sporting event at a sports bar may watch a broadcast as displayed on a television or other screen mounted in the location, while others may prefer to watch the broadcast on their personal mobile device. The latency of receiving the broadcast signal or stream at the television, via a cable or satellite provider, for example, may be different than the latency for the same broadcast as stream to a personal mobile device. It may be desired to have all consumers view the content in a synchronized manner, despite these difference in latency.

In some cases, interactive or even competitive elements may be introduced, such as online gaming or fantasy sports or other real time multi-player competitions. In such cases, it may be considered important, e.g., for fairness, to ensure that all viewers receive the broadcast content in a synchronized manner.

BRIEF DESCRIPTION OF THE DRAWINGS

Various embodiments of the invention are disclosed in the following detailed description and the accompanying drawings.

DETAILED DESCRIPTION

Figure 1:
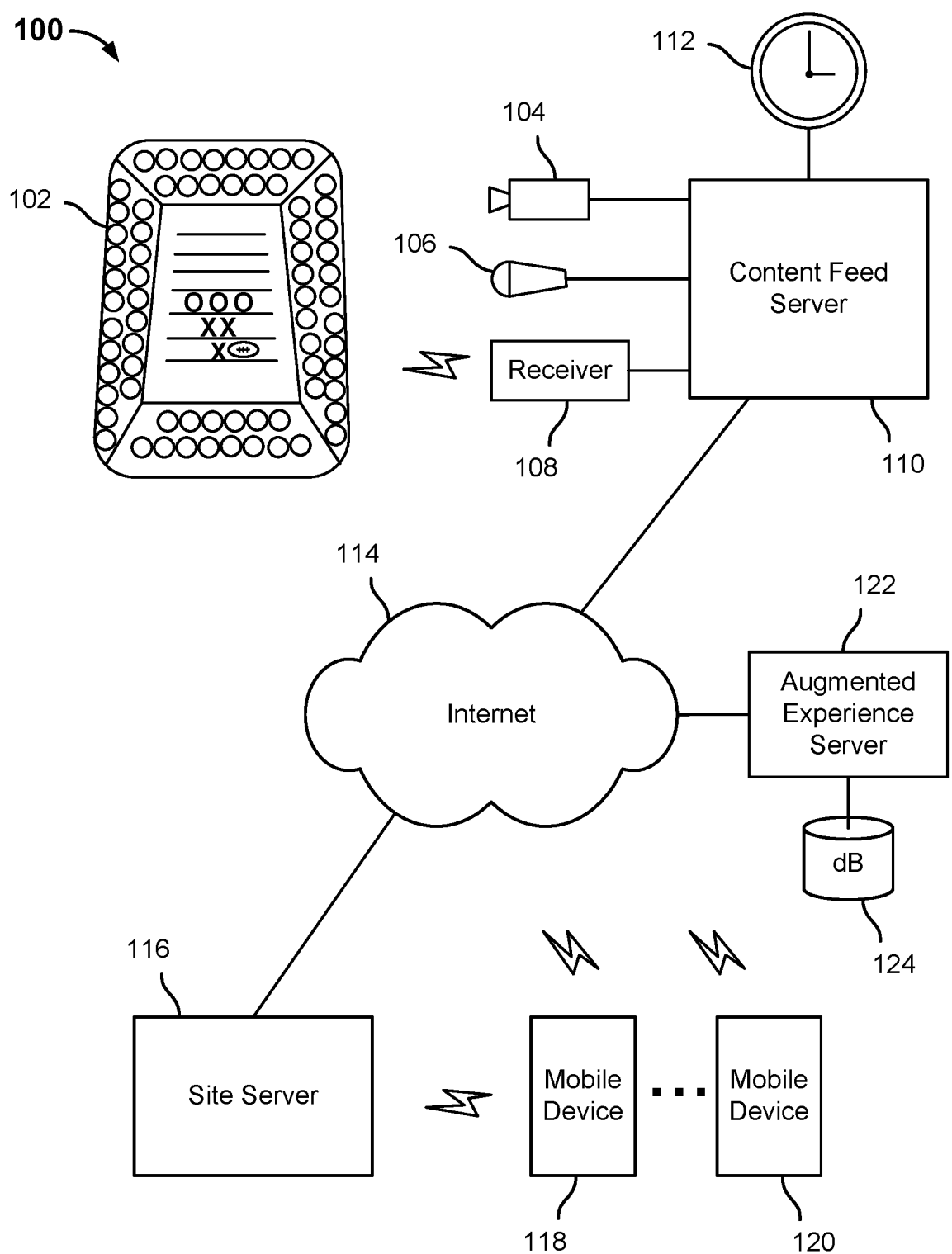
FIG. 1 is a block diagram illustrating an embodiment of a system and environment to synchronize display of a broadcast or feed across multiple devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide synchronized consumption of a content feed across multiple devices. In various embodiments, a content provider, such a broadcaster of a live event or a content provider service that streams prerecorded content, provides a synchronization signal that associates each of a plurality of portions of the content stream with a corresponding real-world time (sometimes referred to as a "wall" time or a "wall-clock" time) at the event depicted in the content stream. In various embodiments, the synchronization signal is used at a location to synchronize consumption of the content stream across multiple devices at the location. For example, consumption of a broadcast of a live sports event, e.g., at a sports bar or other venue, may be synchronized among one or more televisions or other monitors associated with the venue and one or more mobile devices of individual patrons or other users at the location.

In some embodiments, a synchronization master node at a location receives and decodes the synchronization signal and broadcasts the synchronization signal and/or a signal derived therefrom to other devices at the location, such as users' mobile devices. The mobile (or other) devices are configured, e.g., via an installed app, to receive and use the synchronization signal to render the content stream (e.g., display video via a display device, play audio via a speaker device, etc.) on the device in a manner that is synchronized with other devices at the location, e.g., the synchronization master (e.g., a network-connected smart television) and/or other users' mobile devices.

In some embodiments, the content provider and/or other another node may be configured to derive the real-world time or other event time from the content stream, such as by recognizing the numerical characters comprising a real-world or other event time displayed visually in the content, e.g., a game clock of a sporting event or a physical clock visible in the content.

FIG. 1 is a block diagram illustrating an embodiment of a system and environment to synchronize display of a broadcast or feed across multiple devices. In the example shown, system and environment 100 include a venue 102, in the example shown a sports stadium, on which an event that is live or prerecorded (i.e., recorded at a prior time at which the event was live) is shown to be taking (or have taken) place, in this example on a sports field in the central part of the venue 102, specifically in the example shown an American football game involving players, represented in FIG. 1 by the X's and O's on the central field of venue 102 and a ball represented by the ball shown adjacent to the single X in the bottommost occupied part of the field as shown. The event is captured, in this example, by one or more video cameras 104, which produce video and/or audiovisual content; one or more microphones 106, which generate audio content; and (optionally) a plurality of sensors, not shown in FIG. 1, the output of which is received via wireless communications by a receiver 108. In some embodiments, receiver 108 is configured to receive sensor data comprising position information from each of one or more players and/or a ball or other equipment. In various embodiments, other image, audio, position, or other sensors and/or capture equipment may generate content data associated with the event at venue 102.

In the example shown, the video (and/or still image and/or audiovisual) content data generated by camera(s) 104, audio data capture by microphone(s) 106, and position (or other) sensor data received by receiver 108 are provided to content feed server 110. In various embodiments, content feed server 110 comprises one or more computers, workstations, and/or other equipment associated with a broadcaster or other content provider positioned to broadcast and/or record for later consumption a stream or set of content data depicting the event.

The content feed server 110 receives a "real world" (also known as "wall" or "wall time") time signal 112. Time signal 112 comprises a sequence of values each corresponding to a successive real-world time at the venue 102 during pendency of the event that is being broadcast and/or recorded. In some embodies, the times are expressed as the Coordinated Universal Time (UTC).

In various embodiments, content feed server 110 processes content data received from camera(s) 104, microphone(s) 106, and/or receiver 108 into a form to be broadcast (e.g., streamed) and/or stored, according to one or more communication and/or content data storage protocols. For each discrete set (e.g., chunk) of content data, content feed server 110 uses the real time signal 112 to associate with the set of content data a corresponding tuple that includes an event identifier for the event being broadcast and/or recorded and a corresponding real world time, the latter time indicating the real world time at which the scene (e.g., visual, audio, positional) depicted by that set of content data occurred at the venue during the event.

In various embodiments, one or more of a software development kit (SDK), plug in, application, application programming interface (API), and/or other software running on the content feed server 110 may be used to associate portions of content with corresponding real-world times at the venue at which the event is occurring or occurred.

Referring further to FIG. 1, in the example shown the content feed server 110 is connected via the Internet 114 to a remote site server 116. The site server 116 is configured, in various embodiments, to decode and display (render) an event content stream received from the content feed server 110 and/or from a node at which content recorded previously by content feed server 110 is streamed. Examples of a site server 116 include, without limitation, a computer and associated display and/or a smart television or other device comprising a communication interface to receive the content stream, a processor to decode the content stream, and a display device and/or speaker(s) to render the decoded content. In various embodiments, the site server 116 may be a smart television or other device at a viewing venue, such as a sports bar, a private club, or any other public or private venue.

In the example shown, a plurality of mobile devices, such as mobile phones, tablets, smart watches, etc., represented in FIG. 1 by mobile devices 118 and 120, are present in a same viewing location as site server 116. The mobile devices are in wireless communication with the Internet 114 and with the site server 116. For example, the mobile devices 118, 120 may be on a same local wireless (e.g., Wi-Fi) network as the site server 116 and/or may be paired or otherwise in communication via Bluetooth or other near field communication with the site server 116.

In various embodiments, the site server 116 is configured, e.g., by an application, SDK, API, or other software, to receive and decode tuples received from the content feed server 110 in connection with the event content stream, e.g., tuples each of which includes an event identifier associated with the event and a real world time, the tuple being associated with a portion of the content that occurred at the event venue at or very near that real world time. In various embodiments, the site server 116 broadcasts to the mobile devices 118, 120 a local synchronization signal that comprises and/or is derived from the sequence of tuples received from the content feed server 110. In various embodiments, the site server 116 and/or mobile devices 118, 120 use the locally broadcast synchronization signal to display content data depicting and/or otherwise associated with the event in a synchronized manner. In various embodiments, the synchronization ensures that at any given time the site server 116 and the mobile devices 118, 120 are displaying content data associated with the event that occurred at the same real-world time.

FIG. 1 shows an optional augmented experience server 122 that is present in some embodiments. In some embodiments, the augmented experience server 122 uses configuration and/or other data stored in database 124 (e.g., user profiles, game play information, game or gaming state information, betting odds, etc.) to generate and provide to one or more of site server 116 and mobile devices 118, 120 additional virtual content to augment the real content provided by content feed server 110. Examples include, without limitation, data to display to viewers of site server 116 and/or users of mobile devices 118, 120 content such as betting odds, interactive features to facilitate wager and/or multi-player game play, avatars and/or other personalization, branding information, ads or other marketing content, fantasy sports league information, etc.

In various embodiments, techniques disclosed herein are used to ensure fairness and a shared experience by synchronizing the display of event content and related information across multiple devices at a viewing site, e.g., site server 116 and mobile devices 118, 120.

While the above example refers to a sports competition that is broadcast and/or recorded live, in various embodiments synchronized viewing of other events may be provided, including without limitation a live music or dramatic performance, a speech or lecture, a demonstration or meeting, a parade, a class, or any live (or recorded live) event.

Figure 2:
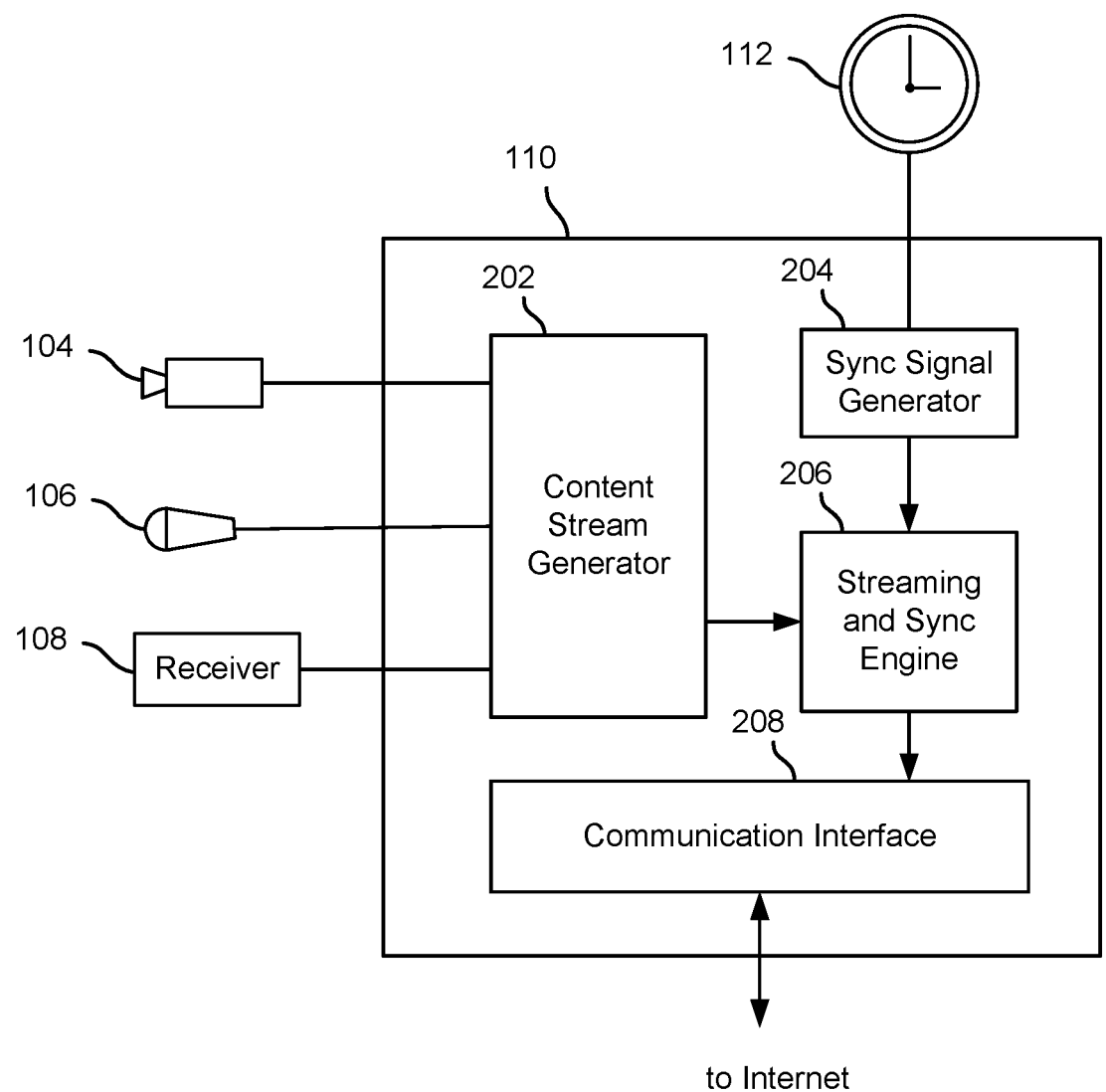
FIG. 2 is a block diagram illustrating an embodiment of a content provider system to synchronize display of a broadcast or feed across multiple devices.

FIG. 2 is a block diagram illustrating an embodiment of a content provider system to synchronize display of a broadcast or feed across multiple devices. In the example shown, content feed server 110 of FIG. 1 includes a content stream generator module 202. In various embodiments, event content data received from one or more of camera(s) 104, microphone(s) 106, and sensor receiver 108 are received by content stream generator 202 and combined, encoded, and/or formatted into a form to be streamed (or stored in a memory or other storage medium, e.g., for later streaming) to a remote destination, such as a computer, television, mobile device, or other viewing device, for consumption. The content feed server 110, in this example, further includes a synchronization signal generator 204 configured to generate a synchronization stream using the real-world time feed 112. For example, the sync signal generator may comprise SDK or other software running on content feed server 110 that is configured to generate and provide as output a stream of tuples, each including at least an event identifier and a real-world time, such as a UTC time at the event.

In the example shown in FIG. 2, the content stream generator 202 and synchronization signal generator 204 provide output to a streaming and synchronization engine 206. The streaming and synchronization engine 206 encapsulates the content stream data provided by content stream generator 202 and the synchronization signal 204 provided by synchronization signal generator 204 into a format suitable for consumption by devices at one or more remote locations, such as site server 116 and mobile devices 118, 120. In various embodiments, streaming and synchronization engine 206 may process the content data received from content stream generator 202 and the synchronization signal generator 204 into a format that conforms to an API and/or communication or other protocol that enables the content data and synchronization signal to be transmitted efficiently to the one or more remote locations, e.g., via the Internet, and to be decoded and used at the remote location to render the content in a manner that is synchronized across multiple devices. The output of the streaming and synchronization engine 206 is provided to a communication interface 208 (e.g., a network interface card or other interface) for transmission to the one or more remote locations.

Figure 3:
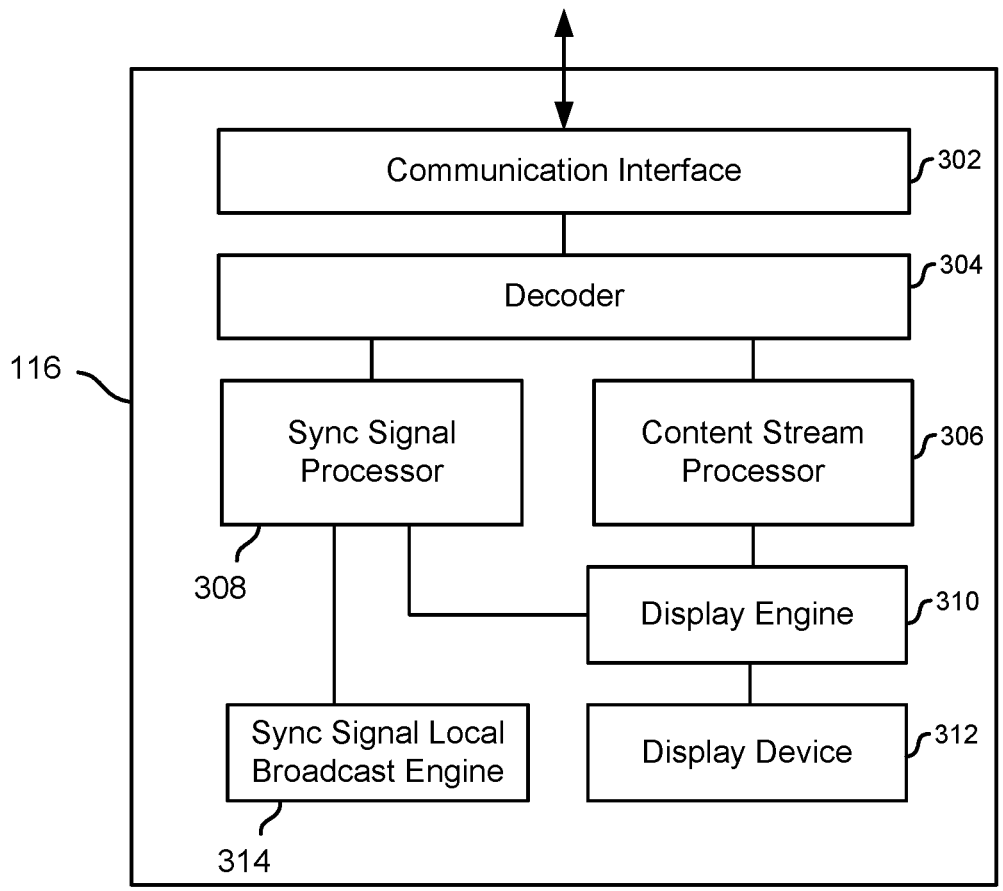
FIG. 3 is a block diagram illustrating an embodiment of a master content display system to synchronize display of a broadcast or feed across multiple devices.

FIG. 3 is a block diagram illustrating an embodiment of a master content display system to synchronize display of a broadcast or feed across multiple devices. In the example shown, site server 116 of FIG. 1 includes a communication interface 302 configured to receive network communications, e.g., communications comprising a content feed and/or synchronization signal as disclosed herein. The communication interface 302 provides received data to a decoder 304 configured to decode/extract content data and a synchronization signal. Content data is provided to a content stream processor 306 and synchronization signal data is provided to a synchronization signal processor 308.

In the example shown, the content stream processor 306 provides content stream data and the synchronization signal processor 308 provides a synchronization signal to the display engine 310, which in various embodiments is configured to use the content stream data and the synchronization signal to render the content stream via one or more display devices 312 (e.g., monitor or other display device, one or more speakers, etc.) in a manner determined at least in part by the synchronization signal. For example, the display engine 310, in some embodiments, controls timing of the rendering of successive portions of the content stream based on the synchronization signal, which in turn enables the content stream to be displayed one other devices, e.g., mobile devices 118, 120, in synchronization with the display of the content stream via the display device(s) 312.

The synchronization signal processor 308 provides the synchronization signal to a synchronization signal local broadcast engine 314. The synchronization signal local broadcast engine 314 broadcasts the synchronization signal locally to one or more other devices in a same physical location as the site server 116, such as mobile devices 118, 120 in the example shown in FIG. 1, via a local network (e.g., Wi-Fi) and/or near field communication (e.g., Bluetooth™).

In various embodiments, one or more of the decoder 304, content stream processor 306, synchronization signal processor 308, display engine 310, and synchronization signal local broadcast engine 314 each may comprises a software module or component, e.g., such as a functional module or component of a software application running on a processor comprising the site server 116. In some embodiments, more or fewer modules may be used and/or the functions, processing, and/or operation described as being performed by one or more of the modules as shown in FIG. 3 may be performed by one or more other or different modules.

Figure 4:
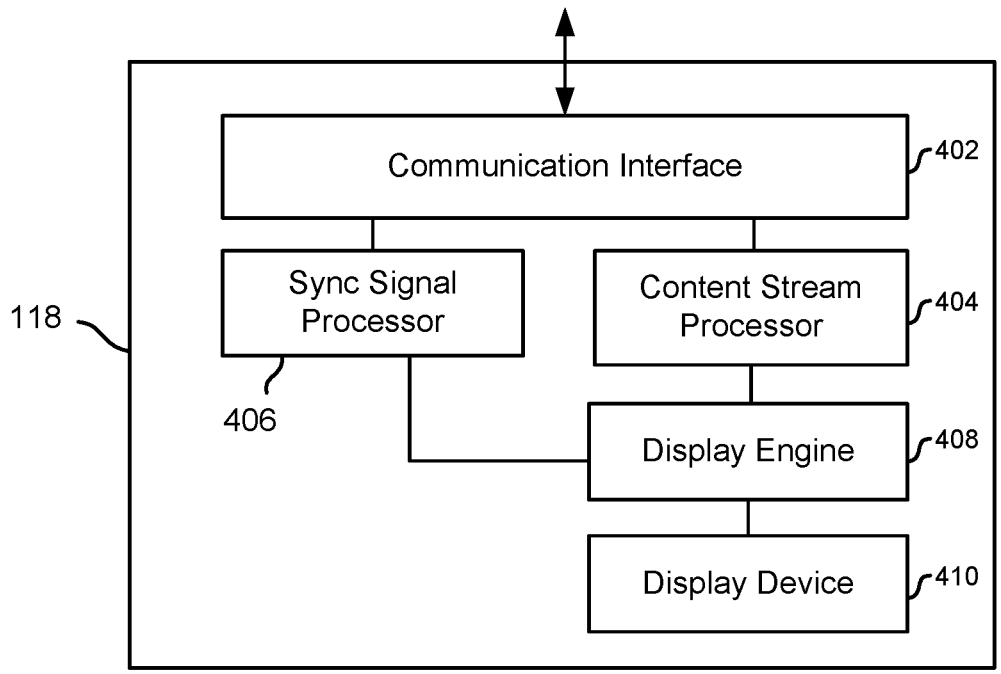
FIG. 4 is a block diagram illustrating an embodiment of a content display device to provide synchronized display of a broadcast or feed.

FIG. 4 is a block diagram illustrating an embodiment of a content display device to provide synchronized display of a broadcast or feed. In the example shown, a mobile device, such as mobile devices 118, 120 of FIG. 1, includes a communication interface 402 configured to receive wireless network and/or other communications. Content stream data received via communication interface 402, e.g., content streamed via the Internet, is provided to a content stream processor 404. Data comprising a locally-broadcast synchronization signal received via communication interface 402 is provided to a synchronization signal processor 406. The synchronization signal processor 406 use the locally-broadcast synchronization signal to provide synchronization information to a display engine 408, which in turn use the synchronization information to display the content stream via display device(s) 410 in a manner determined based at least in part on the synchronization information. For example, the display engine 408, in some embodiments, uses the synchronization signal to control the timing of the display of successive portions of the content stream to maintain synchronization with the display of the corresponding portions of the content stream on one or more other devices at the same location.

Figure 5A:
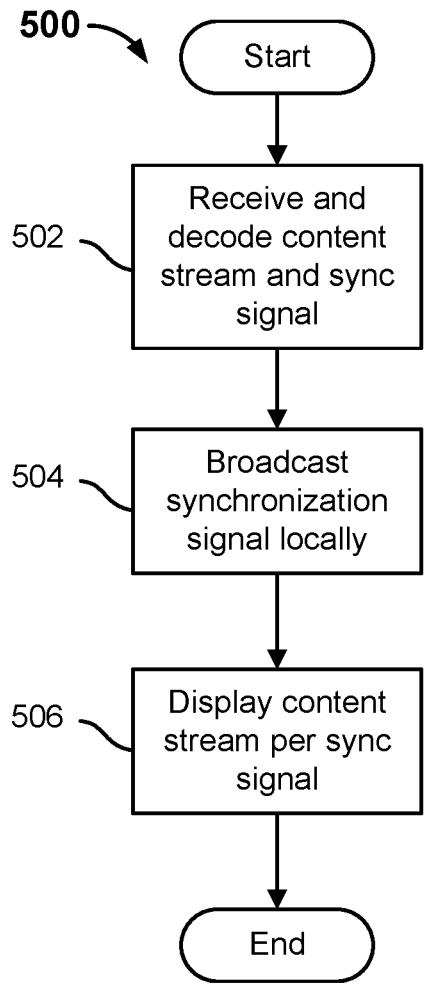
FIG. 5A is a flow diagram illustrating an embodiment of a process to synchronize display of a broadcast or feed across multiple devices.

FIG. 5A is a flow diagram illustrating an embodiment of a process to synchronize display of a broadcast or feed across multiple devices. In various embodiments, the process 500 of FIG. 5A is performed by a computer, server, or smart television or other device having one or more processors, such as site server 116 of FIG. 1. In the example shown, at 502 a content stream and synchronization signal or stream are received. In various embodiments, the synchronization signal/stream comprises a sequence of tuples, each including an event identifier associated uniquely with an event depicted by the content of the content stream and each associated with a corresponding point in and/or portion of the content stream.

In various embodiments, the event identifier included in each synchronization tuple may be mapped to one or more other identifiers associated with the event depicted in the content stream, including by way of example and without limitation an event identifier assigned by a promoter, owner, broadcaster, distributor, or other entity involved in the production of one or both of the event and the content stream depicting the event.

At 504, the synchronization signal and/or a local synchronization signal derived therefrom is broadcast locally, e.g., via network communications, such as Ethernet; cellular; or Wi-Fi and/or Bluetooth™ or other near field communications and/or audio fingerprinting or optical data transfer such as QR codes. In some embodiments, the synchronization signal is "broadcast" visually and/or via audio techniques, such as those described below.

At 506, the content stream is displayed (e.g., video via a monitor or other display device, audio via speakers, etc.) in a manner determined at least in part by the synchronization signal.

Figure 5B:
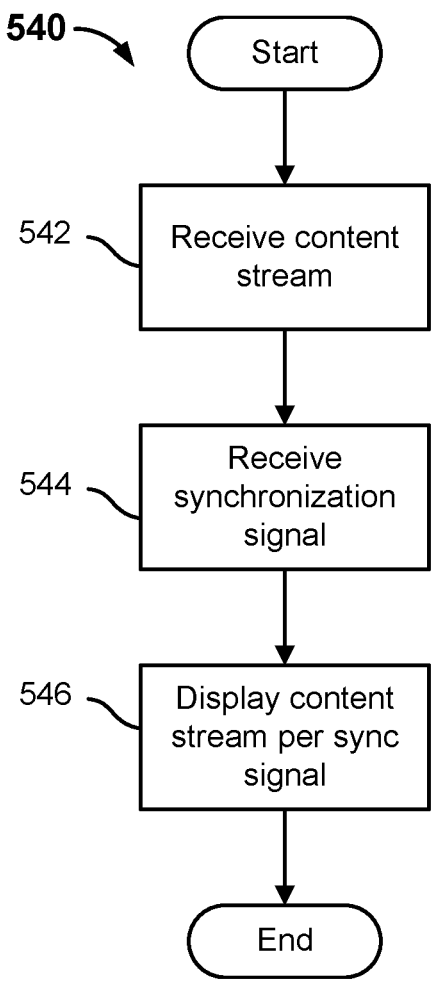
FIG. 5B is a flow diagram illustrating an embodiment of a process to provide synchronized display of a broadcast or feed.

FIG. 5B is a flow diagram illustrating an embodiment of a process to provide synchronized display of a broadcast or feed. In various embodiments, the process 540 of FIG. 5B is performed by one or more slave or follower devices at a site, such as the mobile devices 118, 120 of FIG. 1. In the example shown, at 542 a content stream is received, e.g., via the Internet. The content stream may be received by an application running on the mobile device. At 544, a locally-broadcast synchronization signal is received, e.g., via Wi-Fi or Bluetooth™ or other near field communications. The synchronization signal received at 544 may be broadcast by a local master or other coordinating node, such as site server 116 in the example shown in FIG. 1. At 546, the content stream is displayed in a manner determined at least in part by the synchronization signal. For example, the synchronization signal may be used to display the content in synchronization with one or more other devices at the same location.

Figure 6A:
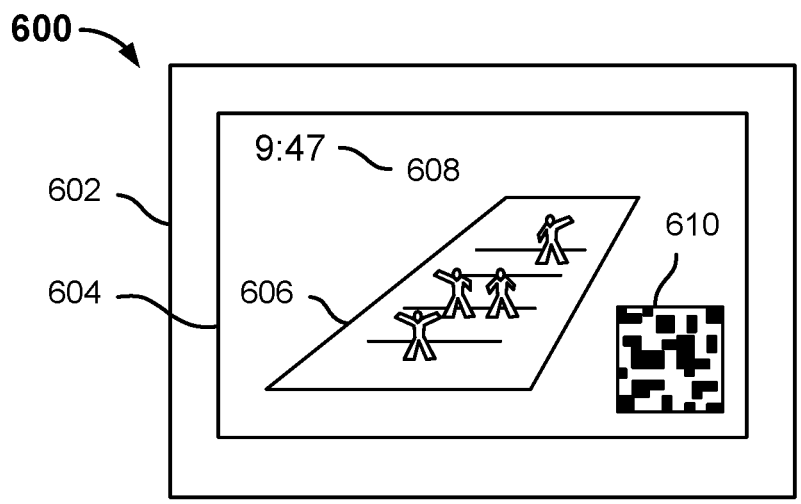
FIG. 6A illustrates an example of a synchronized display provided in some embodiments, e.g., by a local master content system or device.

FIG. 6A illustrates an example of a synchronized display provided in some embodiments, e.g., by a local master content system or device. In various embodiments, the display 600 of FIG. 6A may be displayed by a master or lead device at a location, such as site server 116 in the example shown in FIG. 1. In the example shown in FIG. 6A, display 600 includes a display device 602 on which a scene 604 is displayed. The scene 604 depicts an event 606, in this example a sporting event being played on a field. The scene 604 in this example includes a game (or wall) clock 608 which, in various embodiments, may comprise a dynamically changing value for one or more of a real-world time, a game time, and a time remaining until the end of the event and/or a defined portion thereof, such as a quarter or other period of play.

In the example shown in FIG. 6A, the displayed scene 604 further includes a dynamic optical code 610. In various embodiments, the dynamic optical code 610 encodes a real-world time (and optionally other metadata, such as an event or content identifier) associated with the portion of the event 606 being depicted in scene 604 at the time any given iteration of the dynamic optical code 610 is displayed. In various embodiments, successive iterations or instances of the dynamic optical code 610 are generated locally, e.g., based on a received sequence of tuples and/or other synchronization signal information, as described above. The local device that comprises and/or provides the display 600, e.g., site server 116 of FIG. 1, generates the optical code and integrates it into the displayed scene 604.

In some alternative embodiments, a content feed server, such as content feed server 110, generates the successive versions of the dynamic optical code 610, e.g., based on a real-world time associated with the event, such as the real-world time signal 112 of FIG. 1, and includes in each successive segment of event content the version of dynamic optical code 610 that encodes the real-world event time with which that portion of content is associated. In such embodiments, the master or lead receiving node(s), e.g., site server 116 in the example shown in FIG. 1, display the content feed that includes the dynamically changing optical codes 610.

Figures 6B, 7:
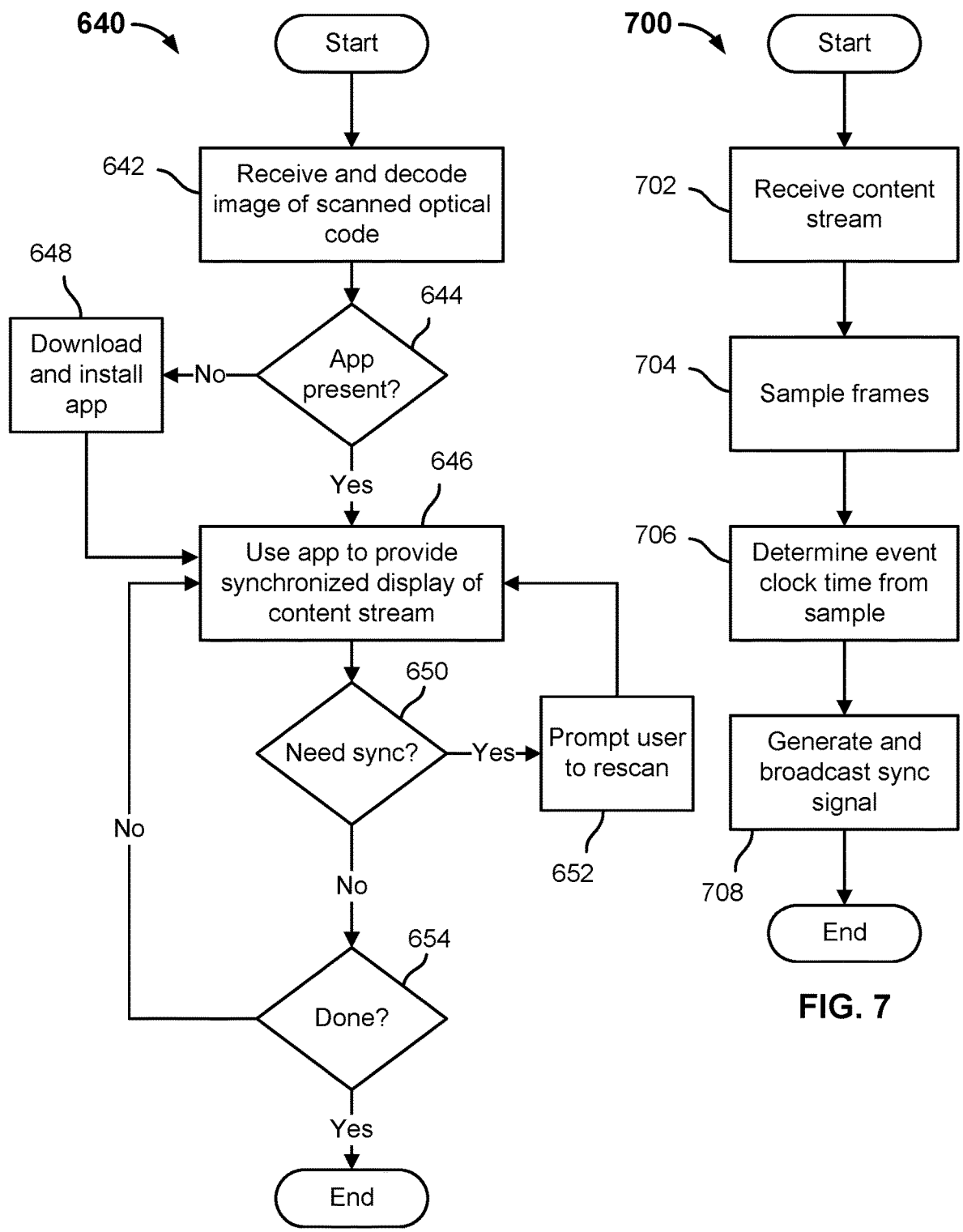
FIG. 6B is a flow diagram illustrating an embodiment of a process to provide synchronized display of a broadcast or feed.
FIG. 7 is a flow diagram illustrating an embodiment of a process to derive synchronization information from a content feed.

FIG. 6B is a flow diagram illustrating an embodiment of a process to provide synchronized display of a broadcast or feed. In various embodiments, the process 640 of FIG. 6B is performed by each of one or more mobile or other user devices at a location, such as mobile devices 118, 120 of FIG. 1.

At 642, the mobile device is used to scan a displayed optical code, such as the dynamic optical code 610 of FIG. 6A. If an associated application is determined at 644 to already be present on the device, then at 646 the application is launched (opened) and used to provide synchronized display of a content stream with which the scanned code is associated. For example, at 646 the application may use an event identifier encoded in the scanned optical code to access a content stream associated with the event and may use a synchronization information encoded in the scanned optical code to display the content stream in a manner determined at least in part by the synchronization information. For example, the device may use a real-world time encoded in the optical code and a mobile device system time difference between when the optical code was scanned and the current time to determine the point in the content stream at which to begin or continue displaying the content.

If at 644 it is determined that the application is not yet present on the device, then at 648 a URL or other information encoded in the optical code is used to download and install the application, after which the application is launched/opened at 646 and used as described above.

If at 650 an indication is received that the display of the content stream may need to be resynchronized, then at 652 the user is prompted to rescan the dynamic optical code, and the synchronization information encoded in the dynamic optical code at the time of rescanning is used to resynchronize (or verify continued synchronization of) the display of content comprising the content stream. Examples of an indication that the display of the content stream may need to be resynchronized include, without limitation, a realization by a user of the mobile device that display of content on their device is out of synchronization with other nearby devices, reaching a threshold amount of device time since the most recent prior scan of the optical code, and detection, e.g., by the application based on audio information received via a microphone of the device, or Bluetooth™ or other computer network information, that other devices nearby are displaying event content other than what the device is displaying at the same time.

Synchronized and/or resynchronized display of the content stream continues as describe above unless/until done (654), e.g., the event content has reached an end or the user has closed the application, left the location, and/or turned off their device.

FIG. 7 is a flow diagram illustrating an embodiment of a process to derive synchronization information from a content feed. In various embodiments, the process 700 is performed by one or both of a broadcaster/recording system, such as content feed server 110 of FIG. 1, or a master device or system at a display location, such as site server 116 of FIG. 1. In various embodiments, the process 700 may be used in addition to (e.g., as a supplement or check or backup process) or instead of receiving a real-world time feed, such as feed/signal 112 of FIG. 1.

In the example shown, at 702 a content stream and/or live or recorded content data is received. At 704, frames of content data are sampled, each sample comprising one or more frames, each comprising an image of a moment in time at the event. At 706, each sample is used to determine a real-world or other time associated with the sampled content. In some embodiments, an event clock shown in each sampled frame, such as the clock 608 in the example shown in FIG. 6A, is detected within the frame (e.g., based on it being rendered in a standard or otherwise known location within the frame) and optical character recognition (OCR) processing is performed to determine the time value that is displayed in the frame. At 708, the determined time values are used to generate and broadcast locally a synchronization signal to be used by one or more devices at the location to display associated event content in synchronization.

Figure 8A:
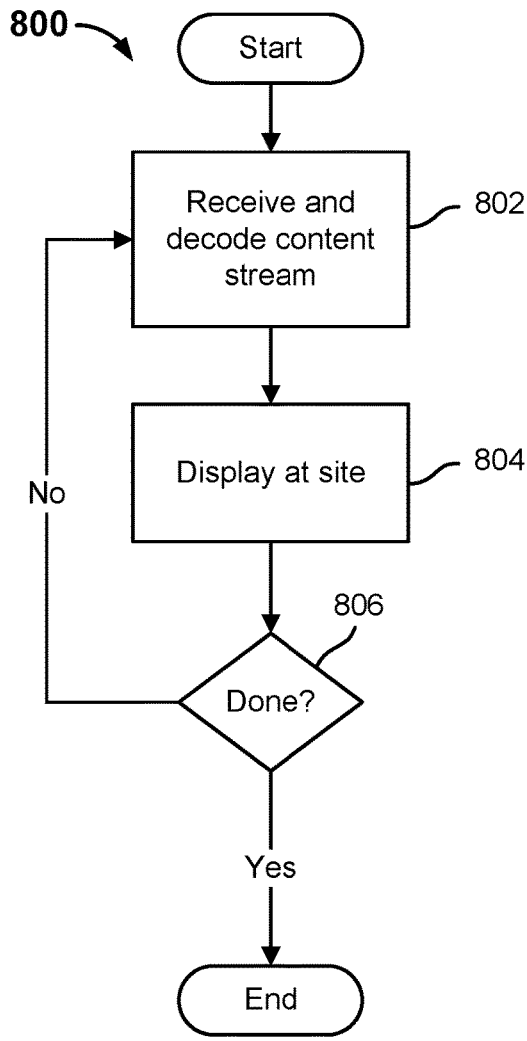
FIG. 8A is a flow diagram illustrating an embodiment of a process to display a broadcast or feed synchronized across multiple devices.

FIG. 8A is a flow diagram illustrating an embodiment of a process to display a broadcast or feed synchronized across multiple devices. In various embodiments, the process 800 of FIG. 8A is performed by a primary display device, such as site server 116, that is not configured to receive and rebroadcast locally a synchronization signal comprising a sequence of tuples, each of which includes an event identifier and real-world time, as described above. Instead, the site server 116 may receive and broadcast the content stream, and the mobile devices 118, 120 may use their microphone to listen to the content as displayed by the site server 116 to detect audio events or signatures and use such events or signatures to synchronize its display of the content stream with the site server 116, e.g., as described below in connection with FIG. 8B.

In the example shown in FIG. 8A, at 802 a content stream is received and decoded. At 804, the content stream is displayed (e.g., video displayed on a monitor, audio played via speakers) until done (806).

Figure 8B:
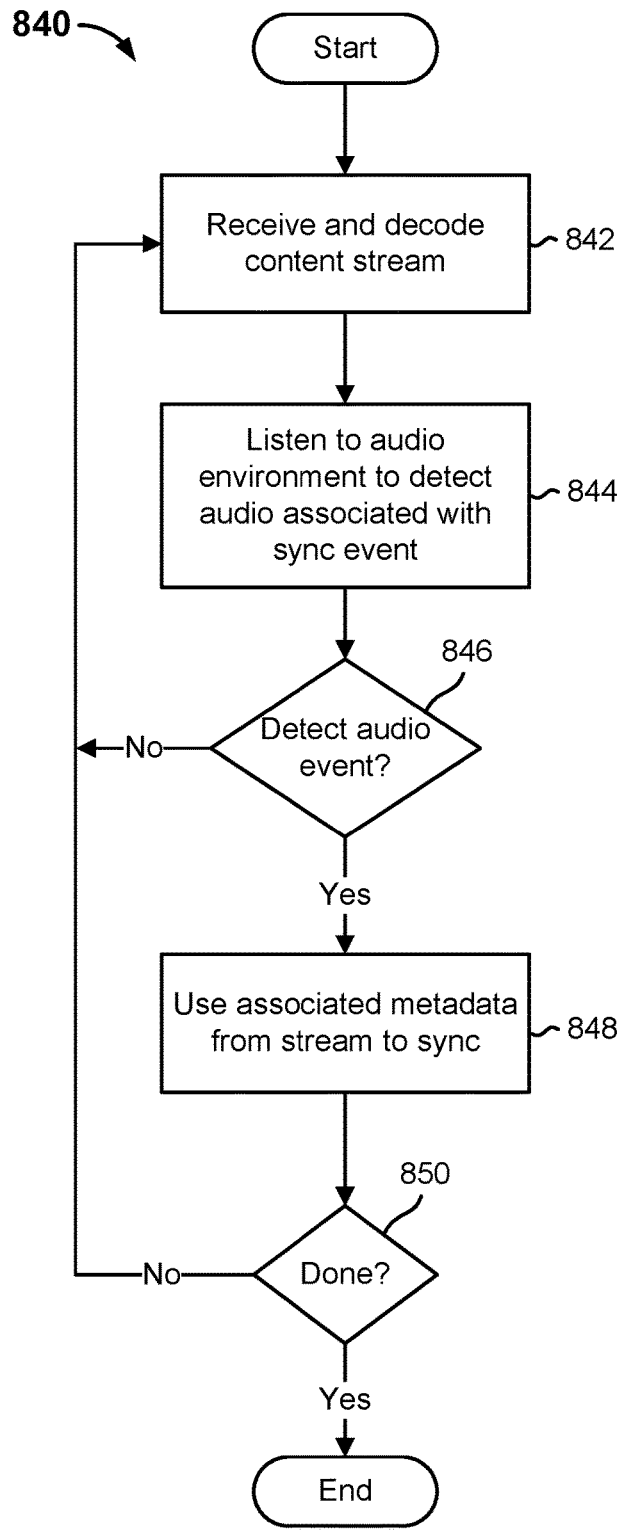
FIG. 8B is a flow diagram illustrating an embodiment of a process to provide synchronized display of a broadcast or feed.

FIG. 8B is a flow diagram illustrating an embodiment of a process to provide synchronized display of a broadcast or feed. In various embodiments, the process 840 of FIG. 8B may be performed by a mobile device in a location at which event content is being displayed via a primary/master device, such as site server 116 of FIG. 1. In the example shown, at 842 the event content stream is received and decoded at the mobile device. In various embodiments, the mobile device continually or periodically samples the received content stream to detect distinctive audio events or signatures. At 844, a microphone of the mobile device is used to listen to the audio environment. The ambient audio environment is sampled and processed to detect audio signatures or events (e.g., a roar of the crowd, music played at the venue, a referees whistle, an airhorn blast, etc.) corresponding to events detected (or flagged and/or included) in the content stream. If a matching audio signature or event is detected (846), the detected audio signature or event is used at 848 to synchronize display of the content stream by the mobile device with the timing of the content as heard in the ambient audio environment. Processing continues until done (850), e.g., the event concludes, or the streaming application is closed.

Figure 9A:
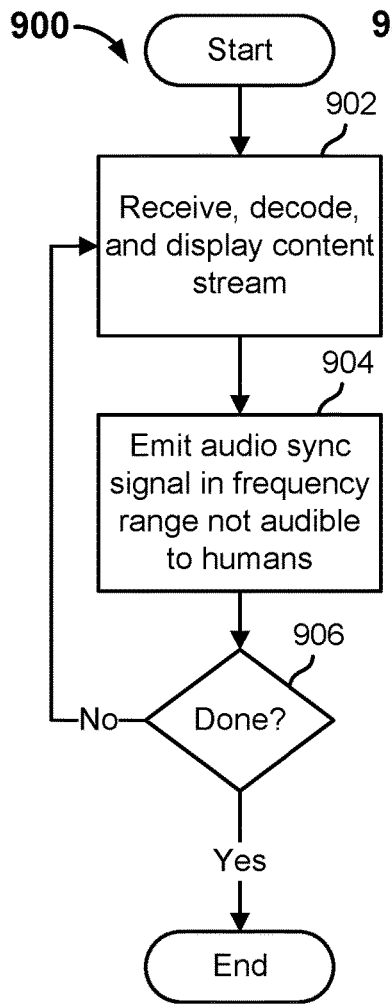
FIG. 9A is a flow diagram illustrating an embodiment of a process to synchronize display of a broadcast or feed across multiple devices.

FIG. 9A is a flow diagram illustrating an embodiment of a process to synchronize display of a broadcast or feed across multiple devices. In various embodiments, the process 900 of FIG. 9A is performed by a primary/master device at a site at which content is displayed via multiple devices, such as site server 116 of FIG. 1. In the example shown, at 902 a content stream is received, decoded, and displayed. At 904, a synchronization signal is received and decoded and is broadcast locally in the form of an audio transmission at a frequency outside the range of human hearing. For example, a local synchronization signal comprising a sequence of tuples each including a real-world event time may be encoded in the (not human hearable, or in some embodiments human hearable) audio signal and broadcast, as described above. Processing continues until done (906), e.g., the event ends.

Figure 9B:
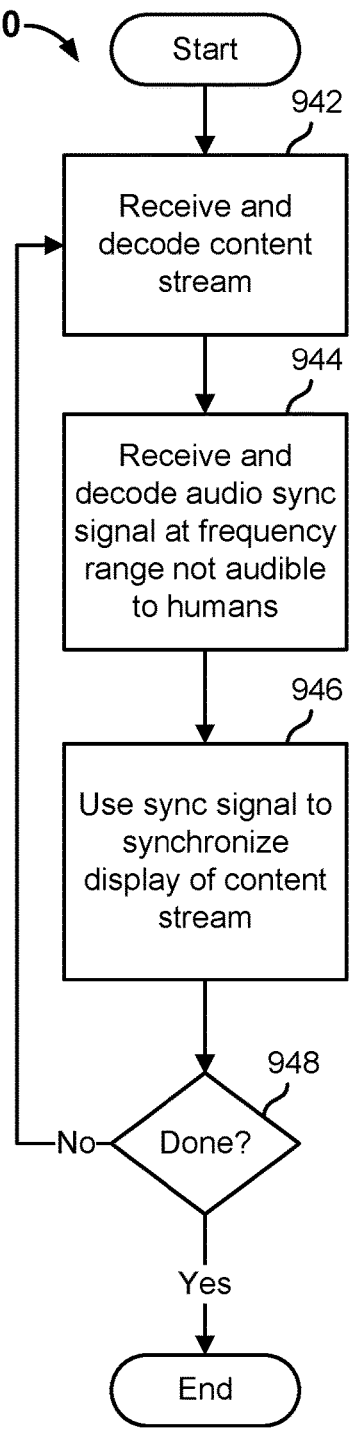
FIG. 9B is a flow diagram illustrating an embodiment of a process to provide synchronized display of a broadcast or feed.

FIG. 9B is a flow diagram illustrating an embodiment of a process to provide synchronized display of a broadcast or feed. In various embodiments, the process 940 of FIG. 9B may be performed by a plurality of mobile devices at a location at which a synchronization signal as described with reference to FIG. 9A is being broadcast locally, such as mobile devices 118, 120 of FIG. 1. In the example shown, at 942 a content stream is received and decoded. At 944, a synchronization signal in the form of a non-human hearable audio signal, as described in connection with FIG. 9A, is received (e.g., via a microphone of the device) and decoded. At 946, the synchronization signal is used to display the content stream in a manner that is determined at least in part by the received synchronization signal, e.g., as described above. Processing continues until done (948), e.g., the event concludes, or the streaming application is closed.

Figure 10:
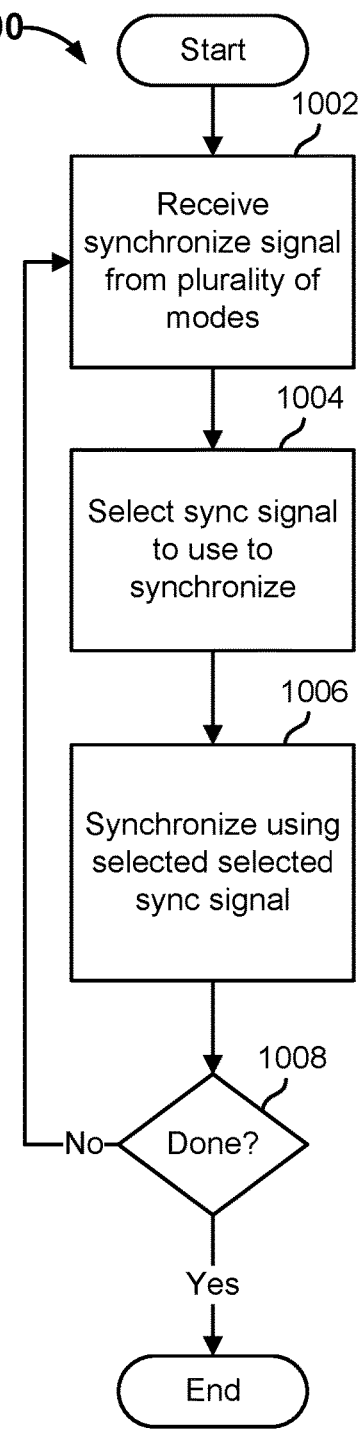
FIG. 10 is a flow diagram illustrating an embodiment of a process to synchronize display of a broadcast or feed across multiple devices.

FIG. 10 is a flow diagram illustrating an embodiment of a process to synchronize display of a broadcast or feed across multiple devices. In various embodiments, the process 1000 of FIG. 10 may be performed by one or more devices at a location in which an event content stream is being displayed via a plurality of devices. In the example shown, at 1002, a synchronization signal and/or information is received and/or derived from a plurality of modes. For example, a mobile device may be configured to synchronize by scanning a dynamic optical code, e.g., as described above in connection with FIGS. 6A and 6B, and to detect synchronization points by detecting audio events or signatures in the nearby environment, as described in connection with FIG. 8B. At 1004, a synchronization signal/information to be used to provide synchronized display of the content stream is selected. In various embodiments, the signal may be selected based on user preferences, presence or absence of sufficient information to use a given mode, a confidence score or other measure based on which a currently preferred or preferable mode may be selected, majority vote or agreement across available modes, averaging across modes, etc. At 1006, the synchronization signal or information associated with the mode selected at 1004 is used to provide synchronized display of the content stream. Processing continues until done (1008), e.g., the event concludes, or the streaming application is closed.

In various embodiments, techniques disclosed herein may be used to provide synchronize consumption of a content feed and/or associated content among a plurality of devices, e.g., in a same physical location.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive a content feed via the communication interface, the content feed comprising a representation of an event;
generate a content stream comprising or derived from the content feed and a synchronization signal that associates each of a plurality of portions of the content stream with a corresponding real-world time at the event depicted in the content stream, wherein the synchronization signal includes an audio signal at a frequency not associated with human hearing; and
provide the content stream and the synchronization signal to a location via the communication interface;
wherein:
a synchronization master at the location is configured to broadcast the synchronization signal locally; and
each of a plurality of devices at the location is configured to:
communicate with the processor via a first channel to receive the content stream;
communicate with the synchronization master via a second channel different from the first channel to receive the synchronization signal; and
use the synchronization signal to render the content stream such that the content stream presented on a respective device of the plurality of devices is synchronized with one or more other of the plurality of devices.

2. The system of claim 1, wherein the processor is further configured to receive a real-world time signal via the communication interface.

3. The system of claim 1, wherein the synchronization signal comprises a series of tuples, each including an event identifier associated with the event and a real-world time.

4. The system of claim 1, wherein the event comprises a live event and the content stream and synchronization signal are generated and provided as output in real time.

5. The system of claim 1, wherein the event and the content feed comprises prerecorded content depicting the event.

6. The system of claim 1, wherein the content feed includes one or more of a video feed, an audio feed, a sensor output, and a position information.

7. The system of claim 1, wherein the processor comprises a plurality of component processors including a first component processor and a second component processor and wherein the content stream is generated by the first component processor and the synchronization signal is generated by the second component processor.

8. The system of claim 7, wherein the first component processor is included in a first physical system and the second component processor is included in a second physical system that is distinct from the first physical system.

9. The system of claim 1, wherein the processor is configured to generate the content stream at a first time and to generate the synchronization signal at a second time.

10. The system of claim 1, wherein the processor is configured to generate the synchronization signal at least in part by receiving a real-world time signal at a same time as the content feed and associating each of a plurality of discrete portions of the content feed with a corresponding real-world time.

11. The system of claim 1, wherein the processor is configured to generate the synchronization signal at least in part by performing optical character recognition processing on visual content comprising a portion of the content feed to determine a real-world time represented by a clock depicted in the visual content.

12. The system of claim 1, wherein the broadcast includes one or more of a network broadcast sent via a local computer network, a wireless network, a Bluetooth™ or other near field transmission.

13. The system of claim 1, wherein the synchronization master is configured to display the content feed and the content feed as displayed includes a dynamic quick response code (QRC) or other dynamic optical code which at any given time encodes a real-world time associated with event content being displayed at that time.

14. The system of claim 13, wherein each of at least a subset of the plurality of devices at the location is configured to scan and decode the dynamic QRC or other dynamic optical code to determine the real-world time associated with event content being displayed at that time and use the determined real-world time to render the content stream in a manner that is synchronized with one or more other of the plurality of devices.

15. The system of claim 1, wherein the first channel is the Internet and the second channel includes near field communications.

16. The system of claim 1, wherein using the synchronization signal to render the content stream includes detecting an audio signature based at least on sampling an ambient audio environment to synchronize the rendering of the content stream with timing of corresponding content in the ambient audio environment.

17. A method, comprising:
receive, at a processor via a communication interface, a content feed comprising a representation of an event;
generate a content stream comprising or derived from the content feed and a synchronization signal that associates each of a plurality of portions of the content stream with a corresponding real-world time at the event depicted in the content stream, wherein the synchronization signal includes an audio signal at a frequency not associated with human hearing; and
provide the content stream and the synchronization signal to a location via the communication interface;
wherein:
a synchronization master at the location is configured to broadcast the synchronization signal locally; and
each of a plurality of devices at the location is configured to:
communicate with the processor via a first channel to receive the content stream;
communicate with the synchronization master via a second channel different from the first channel to receive the synchronization signal; and
use the synchronization signal to render the content stream such that the content stream presented on a respective device of the plurality of devices is synchronized with one or more other of the plurality of devices.

18. The method of claim 17, wherein the synchronization signal comprises a series of tuples, each including an event identifier associated with the event and a real-world time.

19. The method of claim 17, wherein the event comprises a live event and the content stream and synchronization signal are generated and provided as output in real time.

20. A computer program product embodied in a non-transitory computer readable medium, comprising computer instructions for:

receiving, at a processor via a communication interface, a content feed comprising a representation of an event;

generating a content stream comprising or derived from the content feed and a synchronization signal that associates each of a plurality of portions of the content stream with a corresponding real-world time at the event depicted in the content stream, wherein the synchronization signal includes an audio signal at a frequency not associated with human hearing; and providing the content stream and the synchronization signal to a location via the communication interface; wherein:

a synchronization master at the location is configured to broadcast the synchronization signal locally; and each of a plurality of devices at the location is configured to:
   communicate with the processor via a first channel to receive the content stream;
   communicate with the synchronization master via a second channel different from the first channel to receive the synchronization signal; and
   use the synchronization signal to render the content stream such that the content stream presented on a respective device of the plurality of devices is synchronized with one or more other of the plurality of devices.

21. The computer program product of claim 20, wherein the synchronization signal comprises a series of tuples, each including an event identifier associated with the event and a real-world time.

* * * * *